(12) United States Patent
Nam et al.

(10) Patent No.: US 11,416,729 B2
(45) Date of Patent: Aug. 16, 2022

(54) METAL CARD MANUFACTURING METHOD

(71) Applicants: Kona I Co., Ltd., Seoul (KR); Kona M Co., Ltd., Chungcheongbuk-do (KR)

(72) Inventors: Ki Sung Nam, Chungcheongbuk-do (KR); Han Seon Kim, Chungcheongbuk-do (KR); Suk Ku Lee, Seoul (KR)

(73) Assignees: Kona I Co., Ltd., Seoul (KR); Kona M Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 17/254,681

(22) PCT Filed: Jun. 20, 2018

(86) PCT No.: PCT/KR2018/006932
§ 371 (c)(1),
(2) Date: Dec. 21, 2020

(87) PCT Pub. No.: WO2019/245071
PCT Pub. Date: Dec. 26, 2019

(65) Prior Publication Data
US 2021/0279542 A1    Sep. 9, 2021

(51) Int. Cl.
*G06K 19/077* (2006.01)
*B32B 7/12* (2006.01)
(Continued)

(52) U.S. Cl.
CPC .......... *G06K 19/07722* (2013.01); *B32B 7/12* (2013.01); *B32B 15/04* (2013.01);
(Continued)

(58) Field of Classification Search
CPC ........ G06K 19/07722; G06K 19/07779; B32B 7/12; B32B 7/23; B32B 15/04; B32B 38/0004; B32B 2425/00
See application file for complete search history.

(56) References Cited

U.S. PATENT DOCUMENTS 4,852,736 A * 8/1989 Kojima ............ G06K 19/07728
29/830
6,675,456 B2 * 1/2004 Pommer .............. H05K 3/4638
29/466
(Continued)

FOREIGN PATENT DOCUMENTS

CN         105150613 A    12/2015
JP         2003-159753 A    6/2003
(Continued)

*Primary Examiner* — Thien M Le
*Assistant Examiner* — Asifa Habib
(74) *Attorney, Agent, or Firm* — Novick, Kim & Lee, PLLC; Sang Ho Lee; Hyun Woo Shin (57) ABSTRACT

The present invention relates to a metal card manufacturing method including the steps of: preparing a metal sheet having a given size capable of accommodating a plurality of individual cards; forming holes on at least one or more edges of stacked sheets formed by stacking a plurality of sheets inclusive of adhesive sheets and an inlay sheet on which antenna coils are printed, the plurality of sheets having the same size capable of accommodating the plurality of individual cards as each other; fitting the holes formed on the stacked sheets to pins located on a loading plate; placing the metal sheet on top of the stacked sheets; forming a metal card sheet through lamination among the metal sheet and the stacked sheets; and cutting the metal card sheet along individual card outlines of the plurality of individual cards.

7 Claims, 9 Drawing Sheets

(51) Int. Cl.
  *B32B 15/04* (2006.01)
  *B32B 38/00* (2006.01)
(52) U.S. Cl.
  CPC .... *B32B 38/0004* (2013.01); *G06K 19/07779* (2013.01); *B32B 2425/00* (2013.01)

(56) References Cited

U.S. PATENT DOCUMENTS

| | | | | |
|---|---|---|---|---|
| 2002/0042994 | A1* | 4/2002 | Ito | B41J 2/1609 29/830 |
| 2005/0006482 | A1* | 1/2005 | Kano | B29C 65/7808 235/492 |
| 2006/0231198 | A1* | 10/2006 | Vasoya | H05K 3/0008 156/256 |
| 2006/0237544 | A1* | 10/2006 | Matsuura | G06K 19/07779 235/492 |
| 2008/0141527 | A1* | 6/2008 | Lin | H05K 3/4652 29/829 |
| 2008/0197533 | A1* | 8/2008 | Tsao | G06K 19/077 264/241 |
| 2009/0159559 | A1* | 6/2009 | Zhu | H05K 3/4638 156/60 |
| 2009/0200382 | A1* | 8/2009 | Kwon | G06K 19/077 29/601 |
| 2009/0242647 | A1* | 10/2009 | Kim | G06K 19/07749 235/492 |
| 2011/0028293 | A1* | 2/2011 | Atkin | G06F 17/00 493/374 |
| 2014/0021261 | A1* | 1/2014 | Mosteller | G06K 19/022 156/247 |
| 2014/0144993 | A1* | 5/2014 | Seo | G06K 19/06196 235/492 |
| 2016/0087325 | A1* | 3/2016 | Alias | B41F 15/36 333/238 |
| 2017/0249545 | A1* | 8/2017 | Eymard | G06K 19/07747 |
| 2018/0025261 | A1* | 1/2018 | Mosteller | B32B 15/085 235/375 |
| 2019/0204812 | A1* | 7/2019 | Cox | G06K 19/07722 |
| 2019/0354825 | A1* | 11/2019 | Lowe | G06K 19/07773 |
| 2019/0385035 | A1* | 12/2019 | Mosteller | B42D 25/47 |
| 2020/0250504 | A1* | 8/2020 | Lotya | G06K 19/07745 |
| 2021/0127501 | A1* | 4/2021 | Dan | H05K 3/467 |

FOREIGN PATENT DOCUMENTS

| | | |
|---|---|---|
| JP | 2011-018319 A | 1/2011 |
| JP | 2017-537417 A | 12/2017 |
| KR | 10-2009-0115432 A | 11/2009 |
| KR | 10-2012-0127914 A | 11/2012 |
| KR | 10-2013-0051862 A | 5/2013 |
| KR | 10-2017-0087652 A | 7/2017 |
| KR | 10-2017-0120524 A | 10/2017 |
| WO | 2014/113765 A1 | 7/2014 |

* cited by examiner

METAL CARD MANUFACTURING METHOD

TECHNICAL FIELD

The present invention relates to a metal card manufacturing method.

BACKGROUND ART

Recently, a smart card in which an IC chip capable of storing a variety of information is embedded has been widely supplied. It is generally recognized that a plastic card is made of a plastic material, but beyond such general recognition, the smart card, which is made of a differentiated material, is provided to thus make a card user feel visual and tactile satisfaction whenever he or she uses the smart card. When card users select their card to be used, they tend to especially like the smart card that provides a differentiated sense to them when they touch the smart card, in addition to their advantages taken through card payment.

Especially, a smart card (hereinafter referred to as "metal card") with a metal material exposed to an outer surface thereof provides inherent metallic luster and texture to the card user, and accordingly, the metal card is in the limelight as a high quality card capable of increasing the card user's satisfaction. However, the characteristics of the metal material are different from those of plastic, so that it is hard to achieve mass production of metal cards through general plastic card processes.

DISCLOSURE

Technical Problem

Accordingly, the present invention has been made in view of the above-mentioned problems occurring in the related art, and it is an object of the present invention to provide a metal card manufacturing method that is capable of stacking a plurality of large-scale sheets producing a plurality of metal cards on top of each other and cutting the stacked sheets to individual card units, thereby manufacturing a plurality of metal cards at a time through one time layer process.

It is another object of the present invention to provide a metal card manufacturing method that is capable of injecting cold air into the surfaces of stacked sheets inclusive of a metal sheet and large-scale sheets, while cutting individual card outlines of the stacked sheets, thereby stably cutting the individual card outlines.

It is yet another object of the present invention to provide a metal card manufacturing method that is capable of forming holes on large-scale sheets to fix the large-scale sheets in position to thus prevent the large-scale sheets from being twisted in a process of cutting the large-scale sheets, while the large-scale sheets are kept aligned, thereby ensuring uniformity in cutting the individual card outlines.

Technical Solution

To accomplish the above-mentioned objects, according to the present invention, there is provided a metal card manufacturing method including the steps of: preparing a metal sheet having a given size capable of accommodating a plurality of individual cards; forming holes on at least one or more edges of stacked sheets formed by stacking a plurality of sheets inclusive of adhesive sheets and an inlay sheet on which antenna coils are printed, the plurality of sheets having the same size capable of accommodating the plurality of individual cards as each other; fitting the holes formed on the stacked sheets to pins located on a loading plate; placing the metal sheet on top of the stacked sheets; forming a metal card sheet through lamination among the metal sheet and the stacked sheets; and cutting the metal card sheet along individual card outlines of the plurality of individual cards.

According to the present invention, the step of cutting the metal card sheet includes the step of injecting cooling alcohol, while cutting the individual card outlines by means of a cutting tool in a CNC process.

According to the present invention, the step of forming holes on at least one or more edges of the stacked sheets includes the step of punching the holes on positions adjacent to peaks at which the two or more edges of the stacked sheets meet.

According to the present invention, the method further includes the step of exchanging the cutting tool with new one if cutting operations for the individual card outlines are performed over the number of times set in advance.

According to the present invention, the step of preparing the metal sheet includes the steps of: forming holes on at least one or more edges of the metal sheet; and forming insertion spaces on the underside of the metal sheet coming into contact with the stacked sheets through a CNC process.

According to the present invention, the step of preparing the metal sheet further includes the step of inserting machined layers made of a plastic material into the insertion spaces.

According to the present invention, the step of preparing the metal sheet further includes the step of forming machined layer exposure portions on the opposite side surface to the metal sheet side on which the machined layers are inserted.

According to the present invention, the step of cutting the metal card sheet further includes the step of cutting chip exposure areas having a smaller width than the machined layer exposure portions and located inside the individual card outlines to allow the antenna coils of the inlay sheet to be exposed to the outside.

Advantageous Effects

According to the present invention, the metal card manufacturing method is carried out by stacking the large-scale sheets capable of producing the plurality of cards on top of each other and cutting the large-scale sheets to the individual card units, thereby manufacturing the plurality of metal cards at a time through one time layer process.

According to the present invention, further, the metal card manufacturing method is carried out by efficiently cooling heat generated in the process of cutting the individual card outlines of the stacked sheets, thereby stably cutting the individual card outlines.

Furthermore, according to the present invention, the metal card manufacturing method is carried out by forming the holes on the large-scale sheets to fix the large-scale sheets in position to thus prevent the large-scale sheets from being twisted in the process for cutting the large-scale sheets and by fixing the pins to the holes, so that the individual card outlines are cut, while the large-scale sheets are kept aligned.

BRIEF DESCRIPTION OF DRAWINGS

FIGS. 7A and 7B are sectional views taken along the line A-A' of FIG. 6, wherein FIG. 7A shows the metal card sheet before cutting and after laminating and FIG. 7B shows the metal card sheet after cutting.

In the attached drawings, the corresponding parts in embodiments of the present invention are indicated by corresponding reference numerals.

MODE FOR INVENTION

Hereinafter, the present invention will be in detail given with reference to the attached drawing. If it is determined that the detailed explanation on the well known technology related to the present invention makes the scope of the present invention not clear, the explanation will be avoided for the brevity of the description. In the description, it should be noted that the parts corresponding to those of the drawings are indicated by corresponding reference numerals.

In the description, when it is said that one element is described as being "connected" or "coupled" to the other element, one element may be directly connected or coupled to the other element, but it should be understood that another element may be present between the two elements. In the description, further, when it is said that one portion is described as "includes" any component, one element further may include other components unless no specific description is suggested.

Figure 1:
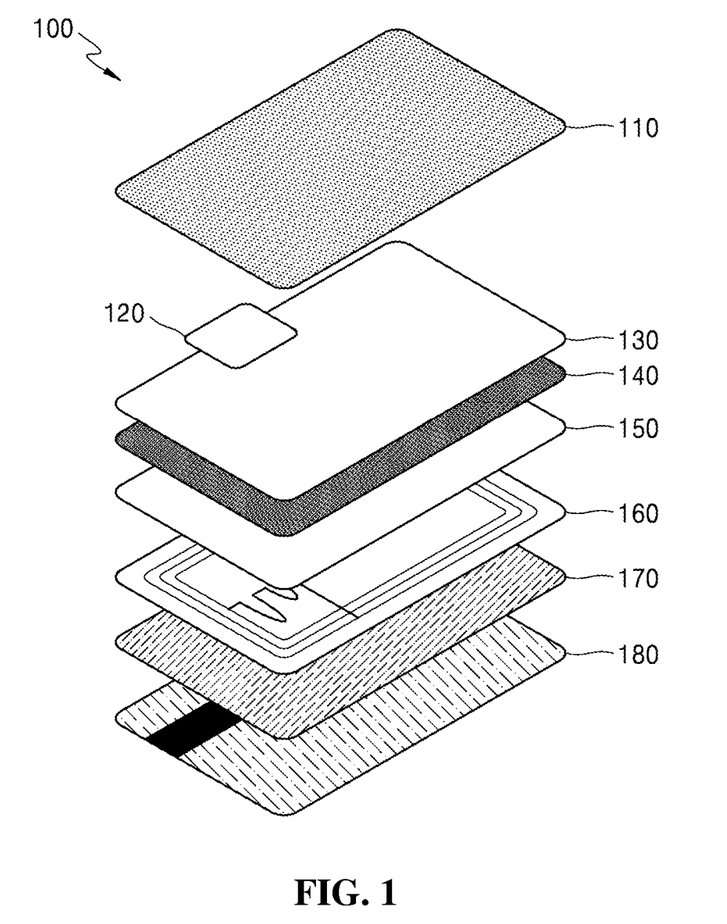
FIG. 1 is a perspective view showing a configuration of one metal card manufactured through a metal card manufacturing method according to the present invention.

FIG. 1 is a perspective view showing a configuration of one metal card manufactured through a metal card manufacturing method according to the present invention.

According to the present invention, a metal card 100 includes one or more layers. Referring to FIG. 1, the metal card 100 includes a metal layer 110, a machined layer 120, an insulating layer 140, an inlay layer 160, a printed layer 170, and a magnetic strip layer 180, and further, the metal card 100 includes one or more adhesive layers 130 and 150 for stably bonding the layers to one another.

The metal layer 110 is a core layer expressing special material and weight of the metal card of the present invention and is made of an SUS (Steel Use Stainless) material. The metal material constituting the metal layer 110 is selected in consideration of materials or weights expressing the characteristics thereof. According to another embodiment of the present invention, the metal material constituting the metal layer 110 may be selected in consideration of durability, abrasion, and deformation with which machining processes are resistant. For example, the metal layer 110 made of the SUS material is strong to corrosion and is not deformed at a substantially high temperature, so that it can be resistant to a cutting process.

The machined layer 120 is a layer made of a plastic material (for example, polyvinyl chloride (PVC)) and having an empty space formed therein. The machined layer 120 is located in a portion of the metal layer 110, not in the whole area of the metal card. According to the present invention, the machined layer 120 is located on a COB (Chip On Board) area like an IC chip mounted in the metal layer 110 and thus provides a space in which antenna coils of the inlay layer 160 and a COB pad come into direct contact with each other. Accordingly, the sensitivity of the antenna coils is improved, and the entire surface of the metal card is formed with the metal material, thereby providing the metal card with a high level outer appearance, while improving a wireless communication function of the metal card.

The insulating layer 140 serves to shield an interference with an electromagnetic field that may occur since the inlay layer 160 on which antenna coils are printed is close to the metal layer 110. Specifically, the antenna coils provided on the inlay layer 160 operate through communication with an external antenna reader, and in this case, a magnetic field is generated from the antenna coils. Accordingly, as the magnetic field generated from the antenna coils interacts with the metal material of the metal layer 110, an SRF (self-resonant frequency) of the antennal coils is changed, so that the inductance of the antenna coils becomes lowered to cause communication troubles. This is because of eddy (eddy current) generated from the metal layer 110 by means of the magnetic field, and so as to eliminate the eddy, the insulating layer 140 having high permeability and high resistance is located between the metal layer 110 and the inlay layer 160 to adjust magnetic field lines. The insulating layer 140 is capable of adjusting the magnetic field, which is thus referred to as an electromagnetic interference shielding layer. According to an embodiment of the present invention, the insulating layer 140 may include a ferromagnetic material.

The inlay layer 160 is a layer having the RF antenna coils printed thereon that serves to allow the metal card 100 to perform near field communication with external components to have contactless payment or allow the metal card 100 to receive power from external power. The number of turns of the antenna coils in the inlay layer 160 is determined to express optimized sensitivity through an RF communication sensitivity test. According to the present invention, further, the antenna coils of the inlay layer 160 have given spaces through the machined layer 120 so that they can be electrically connected to the COB pad while not coming into contact with the metal layer 110.

The printed layer 170 is a layer on which card information is printed and displayed, and the magnetic strip layer 180 is a layer on which a magnetic strip used for payment through swiping is formed. According to the present invention, the magnetic strip layer 180 is provided by attaching the magnetic strip onto a transparent layer.

The metal card 100 includes at least one or more adhesive layers 130 and 150 adapted to bond the layers adjacent thereto to each other. For example, the adhesive layers 130 and 150 are hot melt sheets. A hot melt material is melted by means of heating, and if a material like a thermoplastic resin is heated, melted and then cooled, it becomes solidified.

So as to manufacture the metal card 100 having the plurality of layers inclusive of the metal layer 110, as mentioned above with reference to FIG. 1, the metal card manufacturing method according to the present invention includes the step of preparing a plurality of large-scale sheets corresponding to the respective layers, laminating the plurality of large-scale sheets, and cutting the large-scale sheets to individual card units, thereby making the individual metal cards.

More specifically, the metal card manufacturing method according to the present invention includes the steps of forming holes on the large-scale sheets laminated in such a manner as to be fitted to fixed pins to thus fixedly align the large-scale sheets and cutting the large-scale sheets along individual card outlines at a time, thereby manufacturing the plurality of metal cards through one time sheet process. The metal card manufacturing method according to the present invention has more drastically improved manufacturing efficiency when compared with the metal card manufacturing method in which respective layers constituting the metal card are cut individually.

According to the present invention, the respective layers constituting the metal card 100 as explained with reference to FIG. 1 are provided by cutting large-scale sheets, and the sheets for providing the respective layers have the corresponding reference numerals to the corresponding layers. Accordingly, the metal card 100 can be manufactured with a metal sheet 110s for providing the metal layer 110, an insulating sheet 140s for the insulating layer 140, an inlay sheet 160s for the inlay sheet 160, a printed sheet 170s for the printed layer 170, and a magnetic strip sheet 180s for the magnetic strip layer 180.

Figure 2:
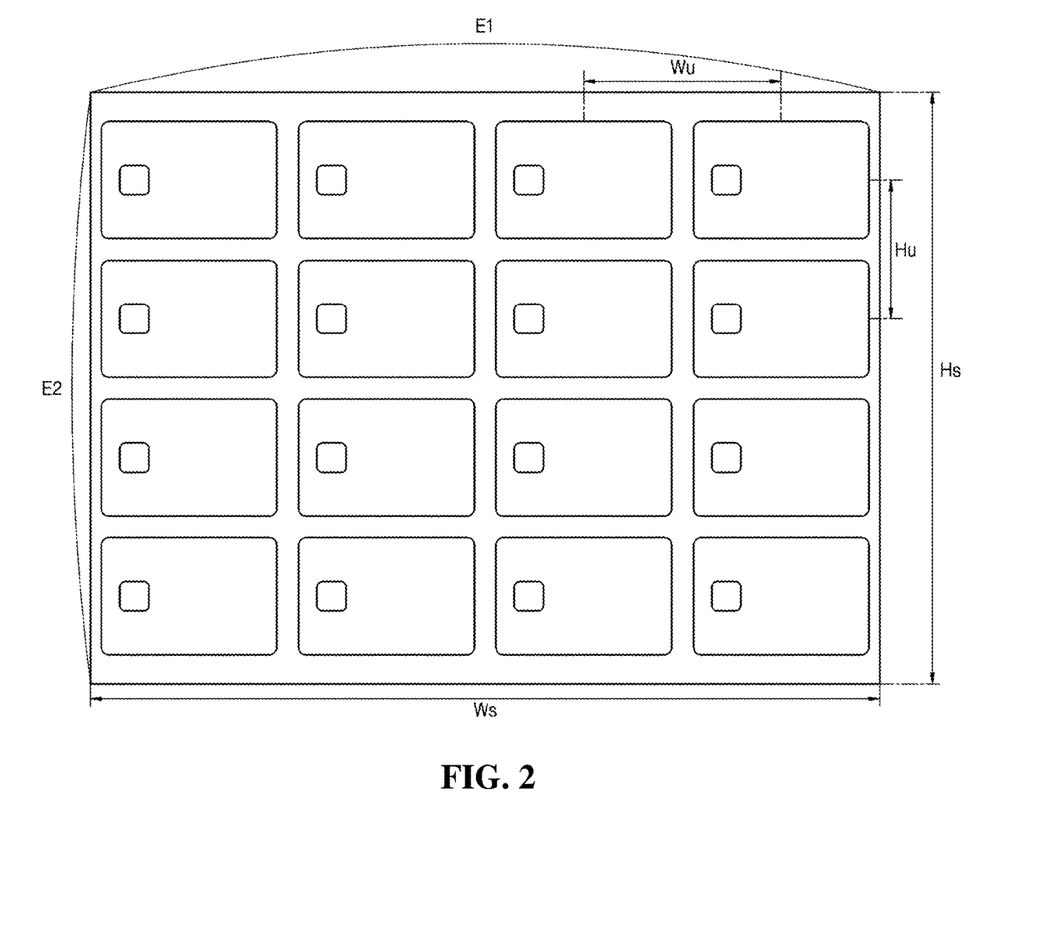
FIG. 2 is a top view showing arrangements of individual metal cards on a large-scale sheet for manufacturing the metal cards according to the present invention.

FIG. 2 is a top view showing arrangements of individual metal cards on a large-scale sheet for manufacturing the metal cards according to the present invention. In FIG. 2, the individual metal cards are arranged along individual card outlines to be cut off to make the individual metal cards after the respective sheets have been laminated on one another. Such individual card outlines may not be indicated on the sheets used in a real manufacturing process, and also, the individual card outlines to be cut off through a CNC process under the control of a controller of a card manufacturing apparatus may be provided. According to the present invention, the respective sheets may have the same width and height as one another.

Each sheet for making the metal cards according to the present invention has the shape of a rectangle having longitudinal edges E1 and transverse edges E2. Each longitudinal edge E1 has a size of a sheet width Ws and each transverse edge E2 has a size of a sheet height Hs. Within the sheets, the individual cards are arranged with a card unit width Wu and a card unit height Hu. For example, the sheet width Ws is 400 mm, the sheet height Hs 300 mm, the card unit width Wu 99 mm, and the card unit height Hu 67.4 mm. The widths and heights are determined on the basis of the size of the metal card 100 and the spare space required in the cutting process of the individual cards through a cutting tool.

According to the present invention, the plurality of sheets as shown in FIG. 2 are laminatedly bonded and then cut to make the individual metal cards, and accordingly, there is need to fixedly align the plurality of sheets. Accordingly, holes are formed on the respective sheets. The holes formed on the sheets are fixed by means of pins, so that the plurality of sheets can be fixedly aligned.

Figure 3:
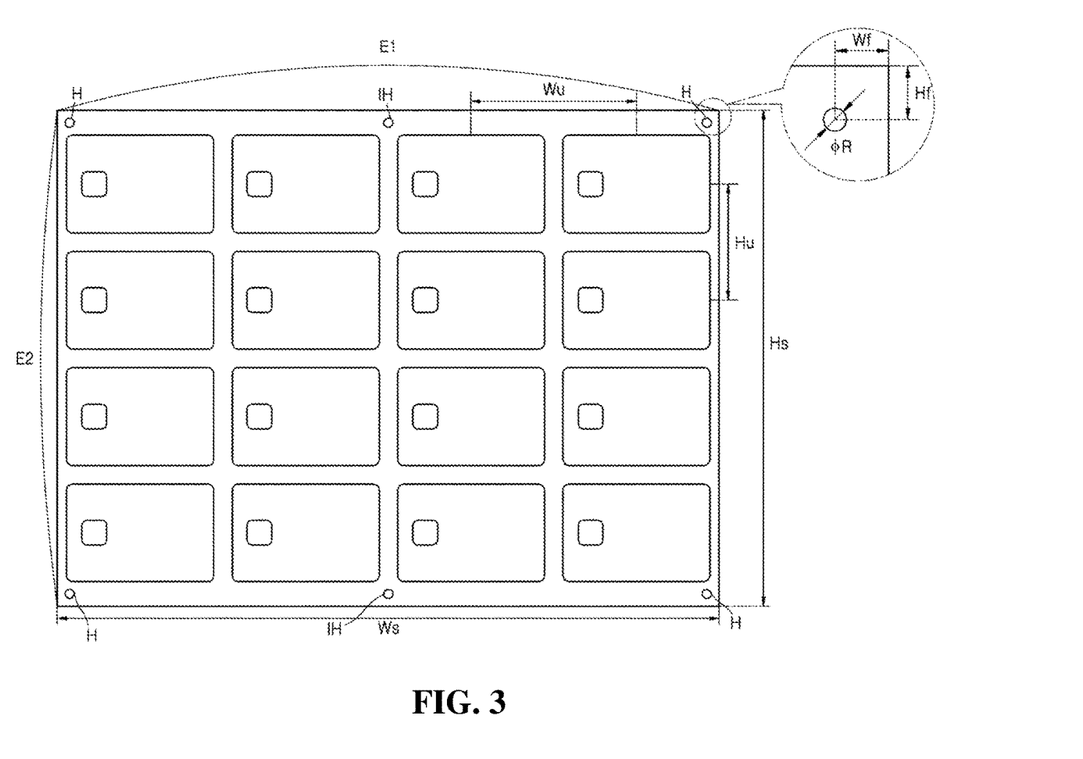
FIG. 3 is a top view showing holes formed on the large-scale sheets for manufacturing the metal cards.

FIG. 3 is a top view showing holes formed on the large-scale sheets for manufacturing the metal cards.

The holes H are formed adjacent to each other from at least one edge of the individual sheet by a predetermined distance, and according to the present invention, the holes H are formed on positions adjacent to peaks at which the two or more edges of the individual sheet meet in such a manner as to be adjacent to each other from two or more edges of the individual sheet by a predetermined distance. As shown in FIG. 3, the four holes H are formed on the peaks at which the longitudinal edges E1 and the transverse edges E2 of the rectangular sheet are adjacent to each other. Each hole H is formed at a position spaced apart from the transverse edge E2 of each sheet by a fixing width Wf and from the longitudinal edge E1 of each sheet by a fixing height Hf. According to the present invention, the fixing width Wf and the fixing height Hf are substantially the same as each other.

Further, each hole H is formed with a predetermined radius R. The predetermined radius R of the hole H is determined according to the radius of the pin for fixing the hole H, the material characteristics of the sheets, and the sizes of the sheets. For example, the radius R of the hole H is 3 mm.

According to the present invention, further, internal holes IH are formed at positions adjacent to edges of each sheet along a transverse or longitudinal direction of the sheet in such a manner as to be spaced apart from one edge of each sheet by the predetermined distance.

In addition to the holes H formed on the peaks of the sheet, the internal holes IH are formed adjacent to the edges of the sheet along the transverse or longitudinal directions, thereby preventing the intermediate portions of the plurality of sheets from being twisted. As the number of individual cards is increased through one sheet, that is, as the size of the sheet becomes large, the number of holes becomes increased. As the sheets are fixed to one another through the holes, the layers for constituting the metal cards are more accurately aligned, so that the outlines, that is, cut surfaces, of the metal cards formed through the cutting can be evenly formed.

For example, as shown in FIG. 3, at least one internal hole IH is formed at the position spaced apart from the longitudinal edge E1 by the predetermined distance (for example, Hf) on the center of the longitudinal edge E1. Of course, at least one internal hole IH may be also formed at the position spaced apart from the transverse edge E2 by the predetermined distance (for example, Wf) on the center of the transverse edge E2.

According to another embodiment of the present invention, the holes H inclusive of the internal holes IH may be formed at given set intervals. For example, the holes H formed on the peaks are spaced apart from the internal holes IH by a given set distance.

Figure 4:
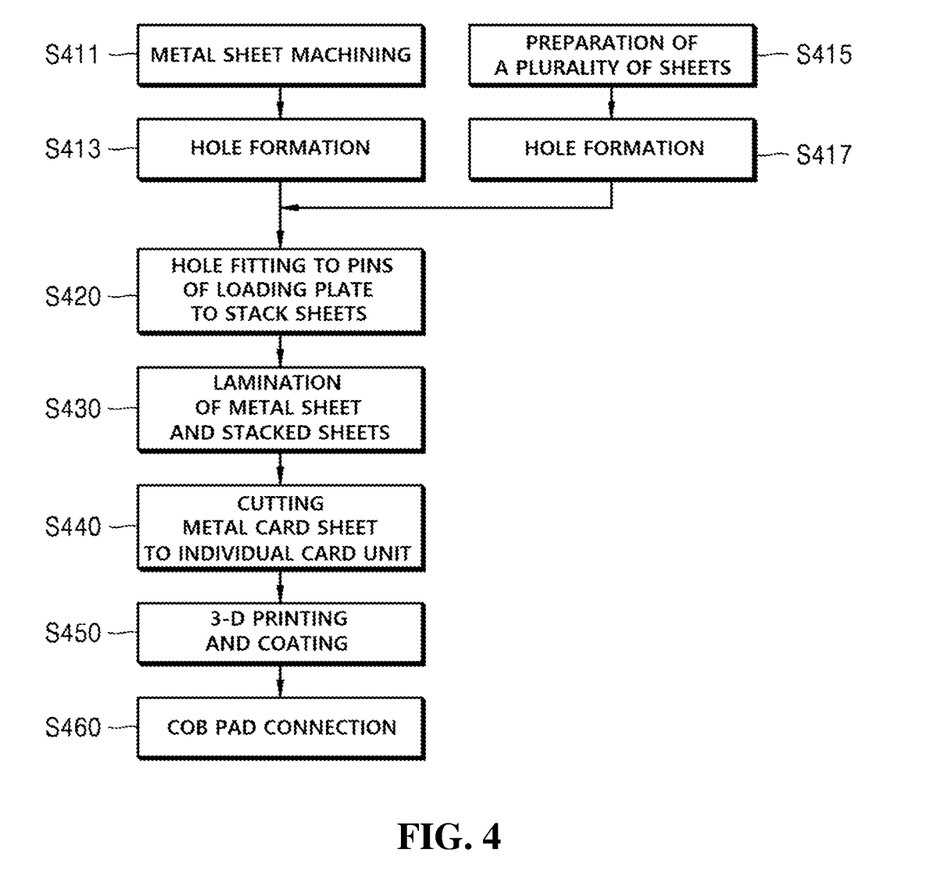
FIG. 4 is a flowchart showing the metal card manufacturing method according to the present invention.

FIG. 4 is a flowchart showing the metal card manufacturing method according to the present invention.

A metal sheet 110s made of a metal material is machined (at step S411). A process for machining the metal sheet 110s includes the steps of forming spaces for inserting the machined layers 120 and exposing a portion of each machined layer 120 after the machined layer 120 has been inserted into the metal sheet 110s. According to embodiments of the present invention, the machined layer insertion spaces are formed on the metal sheet 110s, or the machined layers 120 are exposed through a CNC (Computerized Numerical Control) process. Each machined layer 120 has a lower thickness than the metal sheet 110s, so that it can be inserted into the metal sheet 110s. As each machined layer 120 is located only on a given area of the metal card 100, it is not prepared to the form of the sheet.

Figure 5A:
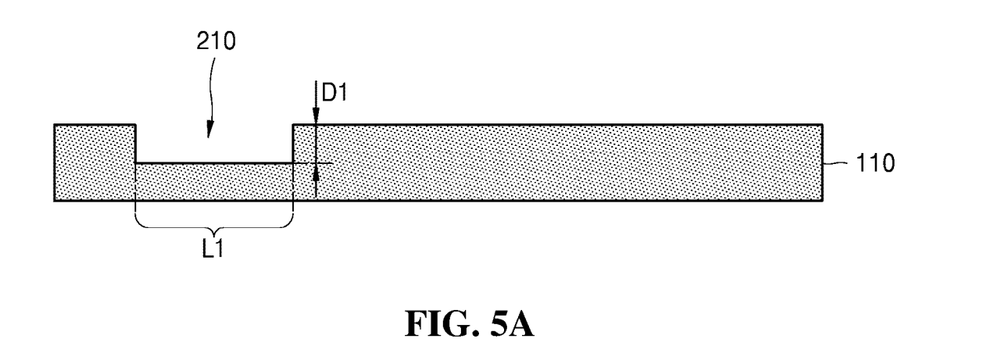
FIGS. 5A to 5C are sectional views showing processes for machining a metal layer in the metal card manufacturing method according to the present invention.
Figure 5B:
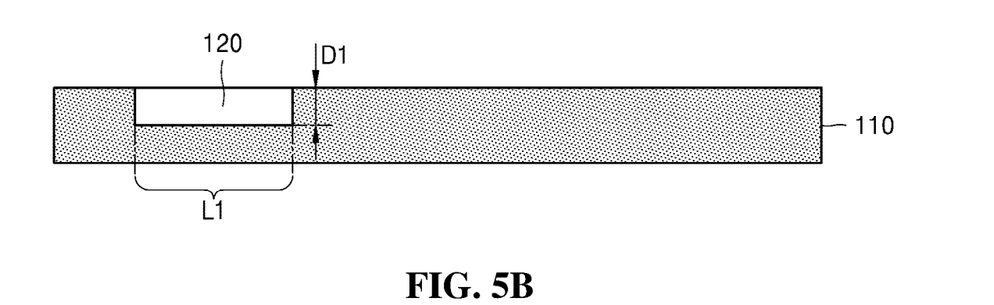
Figure 5C:
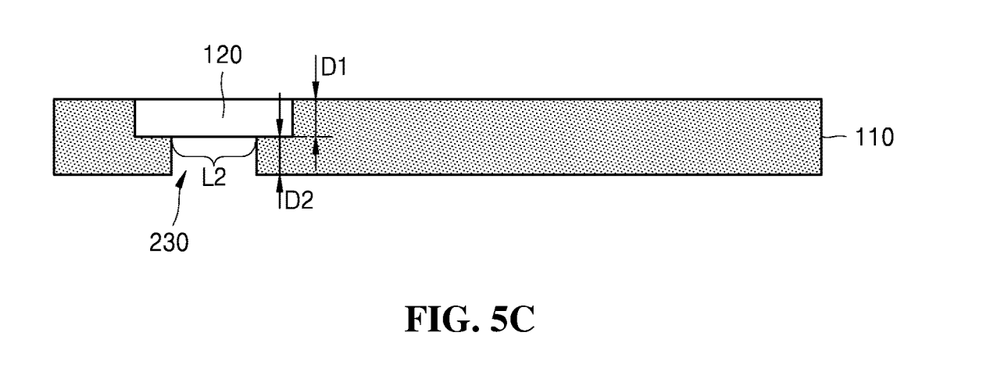

FIGS. 5A to 5C are sectional views showing processes for machining the metal sheet 110s in the method according to the present invention. According to the present invention, a plurality of metal cards 100 are formed on one metal sheet 110s, and accordingly, the plurality of machined layers 120 have to be inserted into the metal sheet 110s. For the convenience of the description, however, an explanation on the metal layer 110 on which one metal card 100 is made will be given with reference to FIGS. 5A to 5C.

Referring to FIG. 5A, a machined layer insertion space 210 into which the machined layer 120 is insertable is formed on the metal layer 110. The machined layer insertion space 210 has a first machining width L1 and a first machining depth D1. As shown in FIG. 5B, further, the machined layer 120 is inserted into the machined layer insertion space 210 formed through a CNC process, and according to embodiments of the present invention, it can be inserted thereinto, without any adhesive. According to embodiments of the present invention, the machined layer 120 has half thickness of the metal layer 110.

Referring to FIG. 5C, the opposite side metal layer 110 to the machined layer 120 is machined to form a machined layer exposure portion 230 from which the machined layer 120 is exposed. In this case, a second machining width L2 of the machined layer exposure portion 230 is smaller than the width (that is, the first machining width L1 of FIG. 5A) of the machined layer insertion space 210. This is to prevent the machined layer 120 from being separated from the metal layer 110 at the time when the metal sheet 110s is laminatedly bonded to the stacked sheets later.

Referring back to FIG. 4, the holes are formed on the metal sheet 110s into which the machined layers 120 are inserted (at step S413). As explained with reference to FIG. 3, the holes are formed spaced apart from at least one edge of the metal sheet 110s by the predetermined distance. According to an embodiment of the present invention, the machined layers 120 may be inserted into the metal sheet 110s after the holes have been formed on the metal sheet 110s.

While the machining process and the hole forming process for the metal sheet 110s are being carried out, the plurality of sheets inclusive of the insulating sheet 140s and the inlay sheet 160s are prepared. According to an embodiment of the present invention, further, the printed sheet 170s and the magnetic strip sheet 180s are prepared (at step S415). The respective sheets are made of proper materials in consideration of their functions and machining processes as mentioned above.

The wireless antenna coils, which are designed adequately for the receiver sensitivity required in the metal card and for the sizes of the individual cards, are printed on the inlay sheet 160s, and the information on the card is printed on the printed sheet 170s. The magnetic strip on which information on card payment is magnetically recorded is cut and located on the magnetic strip sheet 180s.

The insulating sheet 140s is located between the first adhesive sheet 130s and the second adhesive sheet 150s, and the holes are formed on the plurality of sheets after the sheets have been stacked. Otherwise, the sheets are stacked after the holes have been formed on the sheets. In manufacturing the metal cards according to the present invention, the plurality of sheets located on the underside of the metal sheet 110s are referred to as stacked sheets. For example, hole punching is performed onto the respective hole positions of the sheets by means of hole punching equipment (at step S417). As explained with reference to FIG. 3, the holes H or the internal holes IH are indicated on the respective stacked sheets, and they are punched through the hole punching equipment.

Figure 6:
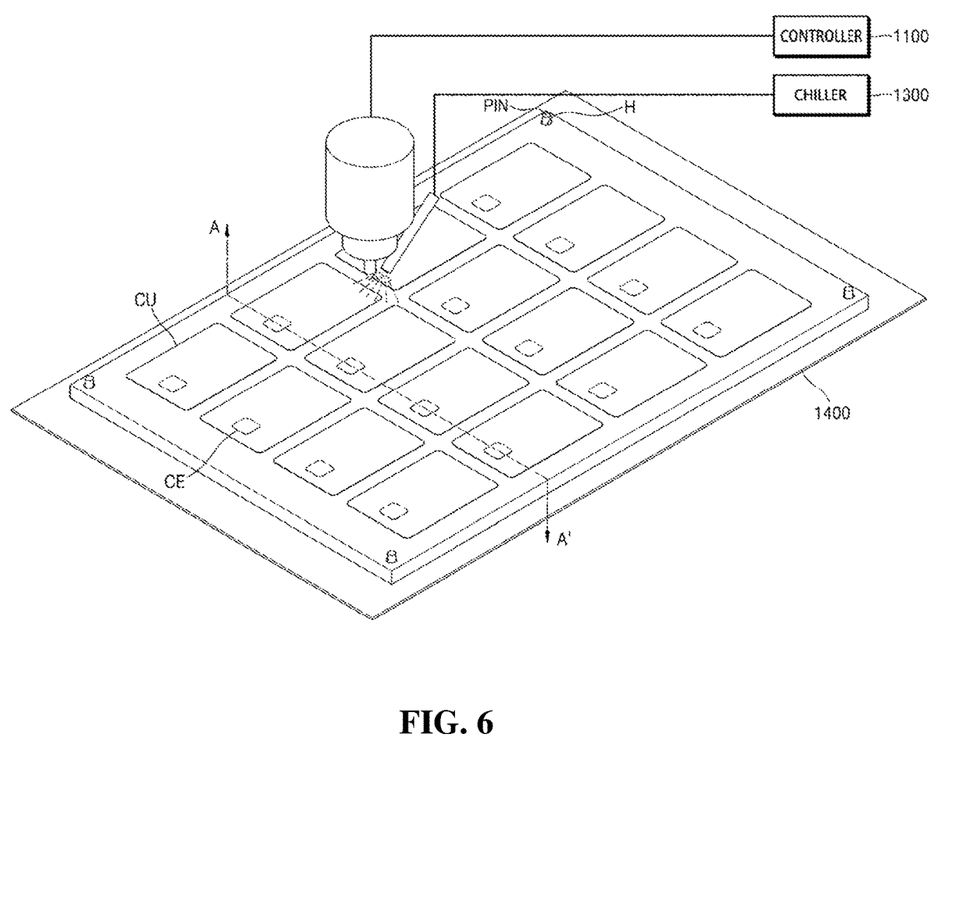
FIG. 6 is a perspective view showing a process for cutting a metal card sheet in the metal card manufacturing method according to the present invention.

FIG. 6 is a perspective view showing a process for cutting a metal card in the metal card manufacturing method according to the present invention.

As shown in FIG. 6, the pins PIN located on a loading plate 1400 are inserted into the holes H formed on the stacked sheets. In the same order as explained with reference to FIG. 1, the stacked sheets prepared through the step S417 are loaded on the loading plate 1400, and the metal sheet 110s prepared (through the step S413), that is, the metal sheet 110s into which the machined layers 120 are inserted and having the machined layer exposure portions 230 formed thereon is loaded on the top of the stacked sheets (at step S420).

The metal sheet 110s and the stacked sheets, which are alignedly stacked through the pins PIN, are laminated by means of heating and pressurization (at step S430). Specifically, the lamination process is carried out by applying a pressure of 20 kg/cm$^2$ to the stacked sheets and the metal sheet 110s at a temperature of 150° C. for about 10 minutes and by then cooling the stacked sheets and the metal sheet 110s in a state of maintaining the same pressure as above.

The plurality of sheets are bonded to one another by means of the laminating process, and as the first adhesive sheet 130s and the second adhesive sheet 150s are melted and cooled, especially, the plurality of sheets are strongly bonded to one another.

According to the present invention, one physical sheet made after the laminating process has been finished is referred to as a metal card sheet 100s. According to the present invention, individual card unit cutting is performed in the state where the pins PIN of the loading plate 1400 are inserted into the holes of the metal card sheet 100s (at step S440).

According to embodiments of the present invention, the loading plate on which the laminating process is carried out may be different from a loading plate on which cutting is carried out. For example, after the metal sheet 110s and the plurality of stacked sheets are fixed to the pins of the loading plate and are then laminated through laminating equipment, the metal card sheet 100s moves to the different loading plate, and then, the cutting process is carried out. However, the configurations of the two loading plates are the same as each other in view of the fact that the plurality of sheets is fixed by the pins PIN.

As shown in FIG. 6, the metal card sheet 100s is cut off along individual card outlines CU by means of a cutting tool 1200, thereby making the individual metal cards. The cutting tool 1200 includes a cutter 1210 and an injector 1220 for injecting a coolant.

The cutter 1210 is made of a specific machining material according to the material characteristics of the metal sheet 110s and the metal card sheet 100s. For example, the cutter 1210 is made of a material having higher stiffness than the metal sheet 110s. The injector 1220 injects alcohol cooled by a chiller 1300.

According to the present invention, in the process where the metal card sheet 100s, particularly, the metal sheet 110s is cut, substantially large amounts of heat and flame are generated, and the heat and flame give bad influences on other components or change the shape of the metal sheet 110s. Accordingly, the alcohol cooled by the chiller 1300 is immediately injected into a position cut through the cutter 1210, thereby minimizing the influences caused by the generation of the heat or flame.

The cutting process through the cutting tool 1200 is carried out by means of the CNC process, and according to an embodiment of the present invention, the CNC process is controlled by means of a controller 1100 as shown in FIG. 6. Through the cutting process, as explained with reference to FIGS. 2 and 3, the individual card outlines CU are cut, and on the other hand, chip exposure areas CE at the inside of the metal sheet 110s are cut, while transversing the machined layers 120 inserted into the metal layer 110s to thus allow the antenna coils of the inlay sheet 160s to be exposed.

According to the present invention, further, the controller 1100 controls the operations of the cutting tool 1200, particularly, the CNC process of the cutting tool 1200. According to another embodiment of the present invention, if the cutting operations of the cutting tool 1200 are performed over the number of times set in advance, the controller 1100 operates to exchange the cutting tool 1200 with new one. So as to exchange the cutting tool 1200 with new one, the controller 1100 records the number of times of the cutting operations performed by the cutting tool 1200, and if the cutting operations are performed over the number of times set in advance, the controller 1100 exchanges the cutting tool 1200 with new one. According to the present invention, specifically, the controller 1100 exchanges the cutter 210 of the cutting tool 1200 with new one. Specifically, a metal card manufacturing apparatus for implementing the metal card manufacturing method according to the present invention is provided with a plurality of cutters, and accordingly, the cutters are exchanged sequentially according to the control of the controller 1100. As the cutters are exchanged sequentially, the metal card manufacturing process does not stop, thereby improving production efficiency.

Furthermore, according to another embodiment of the present invention, the metal card manufacturing apparatus is provided with a monitor (not shown) for monitoring the cutting operations of the metal card sheet 100s to check whether the cutting operations are carried out well or not. According to the monitoring results, the controller 1100 determines whether the cutting tool 1200 is exchanged or not. For example, the monitor continuously observes cutting success rates of the metal card, the evenness of the cut surfaces, and so on.

Figure 7A:
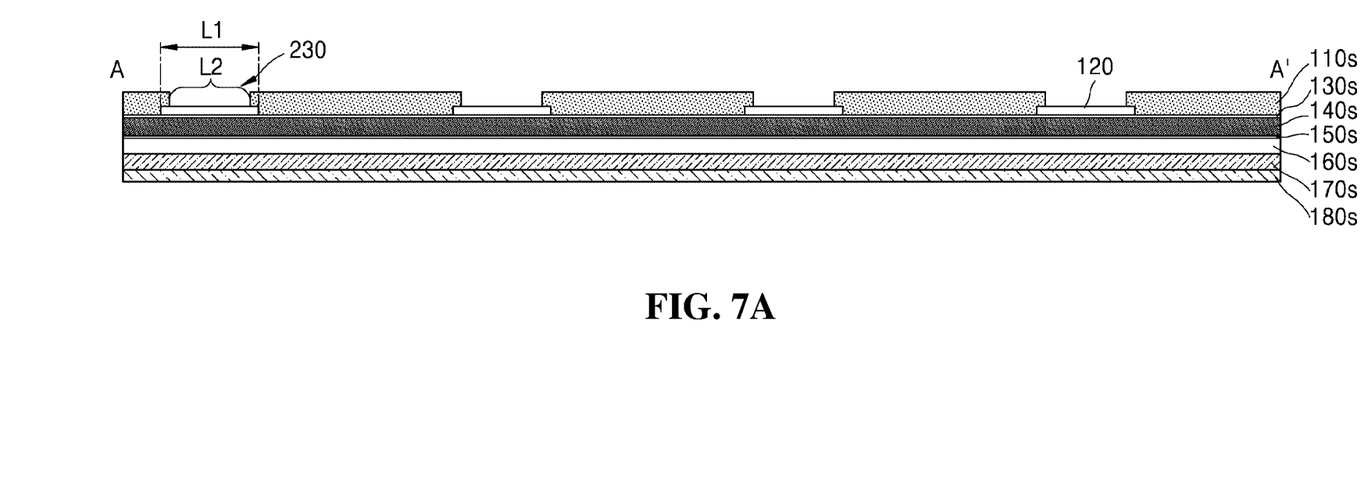
Figure 7B:
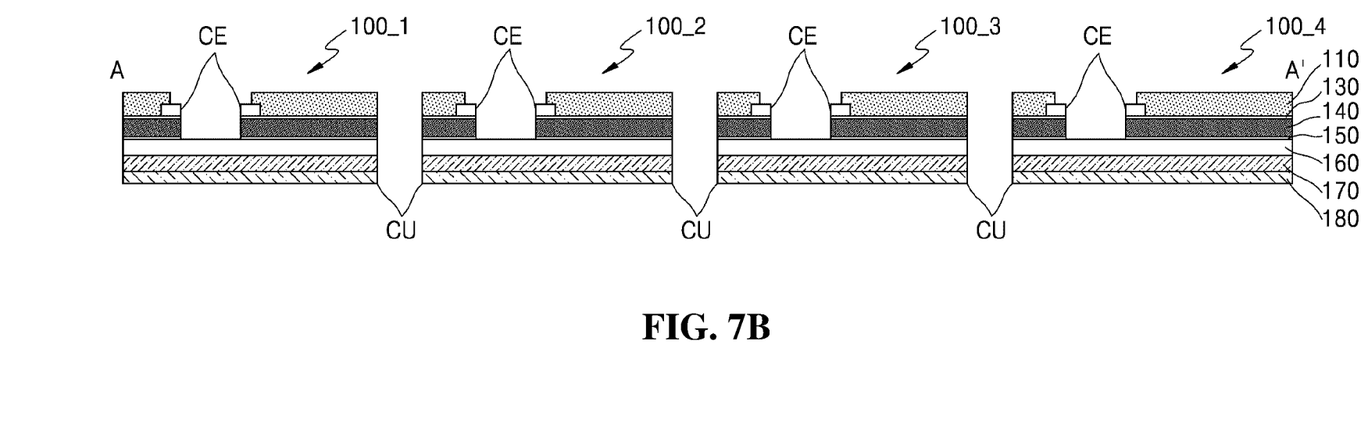

FIGS. 7A and 7B are sectional views taken along the line A-A' of FIG. 6, wherein FIG. 7A shows the metal card sheet before cutting and after laminating and FIG. 7B shows the metal card sheet after cutting.

Referring to FIG. 7A, the machined layers 120 are inserted into one surface of the metal sheet 110s and the machined layer exposure portions 230 are formed on the other surface thereof, which have been explained with reference to FIG. 5. According to the present invention, the metal card sheet 100s is obtained by allowing the surface of the metal sheet 110s into which the machined layers 120 are inserted to come into contact with the top surface of the stacked sheets, that is, the insulating sheet 140s (except the adhesive layers which are melted and solidified in the laminating process) of the stacked sheets.

Referring to FIG. 7B, each chip exposure area CE is machined by a depth at which the inlay layer 160 is exposed. The chip exposure area CE has a third machining width L3 smaller than the second machining width L2 (See FIG. 8A). The reason why the third machining width L3 is smaller than the second machining width L2 is to ensure the connection characteristics of the COB pad in the next metal card process. The individual metal card process will be explained with reference to FIGS. 8A to 8C.

Each individual card outline CU is cut by a thickness corresponding to the entire thickness of the metal card sheet 100s. Referring to FIG. 7B, it can be checked that as the chip exposure area CE is cut at the step S430, the inlay layer 160 is exposed to the outside, and it can be also checked that as the metal card sheet 100s is cut along the individual card outlines CU, the individual metal cards 100_1, 100_2, 100_3, and 100_4 are made.

As the metal card sheet 100s is cut, the plurality of individual metal cards 100_1, 100_2, 100_3, and 100_4 are made, and the individual metal card processes for the respective individual metal cards are carried out.

Three-dimensional printing and coating for the individual metal cards cut in the sheet unit are performed (at step S450). The COB pad is connected to each individual metal card for which the three-dimensional printing and coating have been performed (at step S460). According to embodiments of the present invention, however, the three-dimensional printing and coating may be performed after the COB pad has been connected to each individual metal card. The step of connecting the COB pad to each individual metal card will be first explained.

Figure 8A:
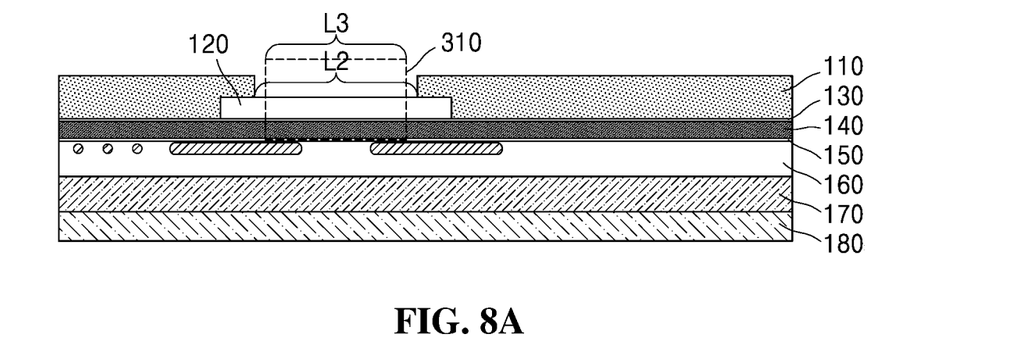
FIGS. 8A to 8C are sectional views showing step S460 of FIG. 4 in which an inlay layer is connected to a COB pad in an individual metal card process.
Figure 8B:
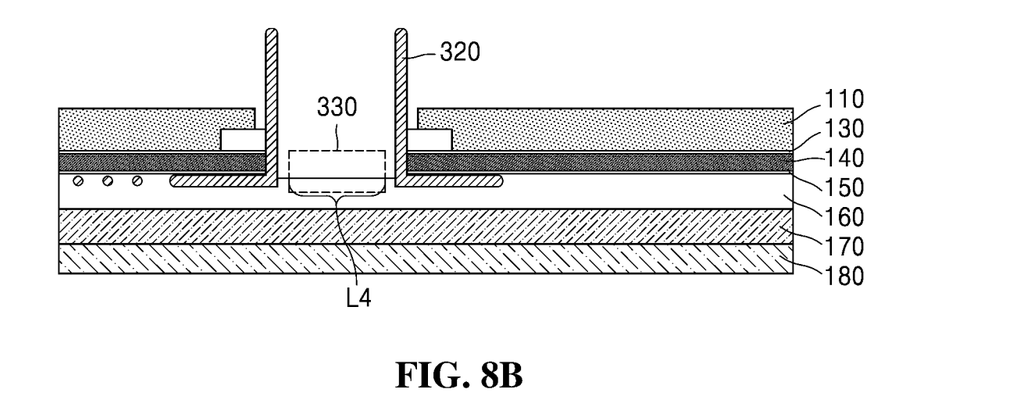
Figure 8C:
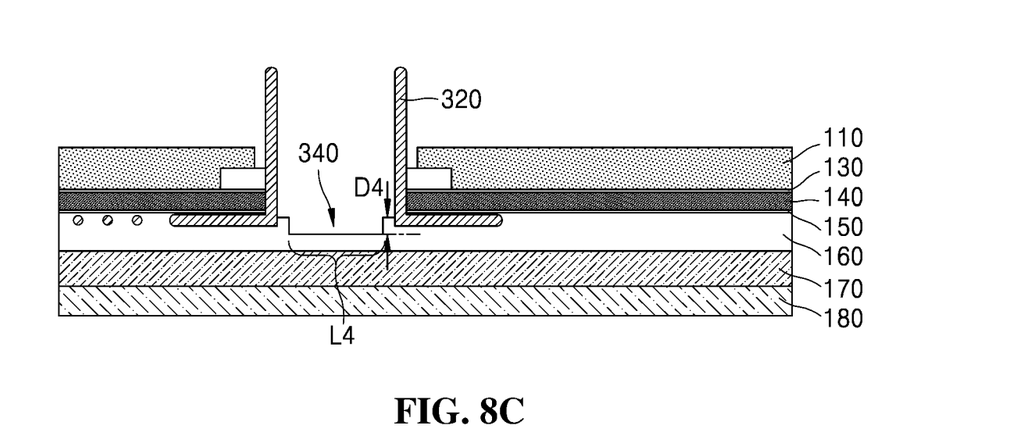

FIGS. 8A to 8C are sectional views showing the step S460 of FIG. 4 in which the inlay layer is connected to the COB pad in the individual metal card process.

More specifically, FIG. 8A shows the exposed shape of the inlay layer 160 on the chip exposure area CE as explained with reference to FIG. 7B, through the CNC process. In FIGS. 8A to 8C, it should be noted that the inlay layer 160 is more magnified than that in the drawings mentioned above so as to explain the antenna coils located therein.

If the inlay layer 160 is exposed, antenna coils 320 printed on the inlay layer 160 are lifted upward through the first milling process as shown in FIG. 8B. For example, the first milling process is carried out in the state where the machined layer exposure portion 230 is located in the up direction with respect to the metal card 100 into which the machined layer 120 is mounted, as shown in FIG. 8A.

Since the third machining width L3 is smaller than the second machining width L2, the antenna coils 320 do not come into contact with the metal layer 110, even while moving upward.

As the antenna coils 320 are lifted upward, another milling process (second milling process) for the exposed inlay layer 160 is performed to form a space for mounting the COB pad, thereby achieving flattening on the top surface of the metal card. If the second milling process is finished, as shown in FIG. 8C, an accommodation recess 340 is formed to insert the COB pad thereinto. The width L4 of the accommodation recess 340 is smaller than the third machining width L3 and the depth D4 thereof is equal to the depth D2 corresponding to the thickness capable of inserting a protruding portion from the underside of the COB pad.

After that, the antenna coils 320 lifted upward are connected with the contact points of the COB pad by means of spot welding, and the COB pad is seated on the accommodation recess 340.

Even if the metal layer 110 is provided, like this, the COB pad and the antenna coils are efficiently connected to each other through the individual metal card process according to the present invention, while electrical contacts therebetween are being shielded.

Figure 9:
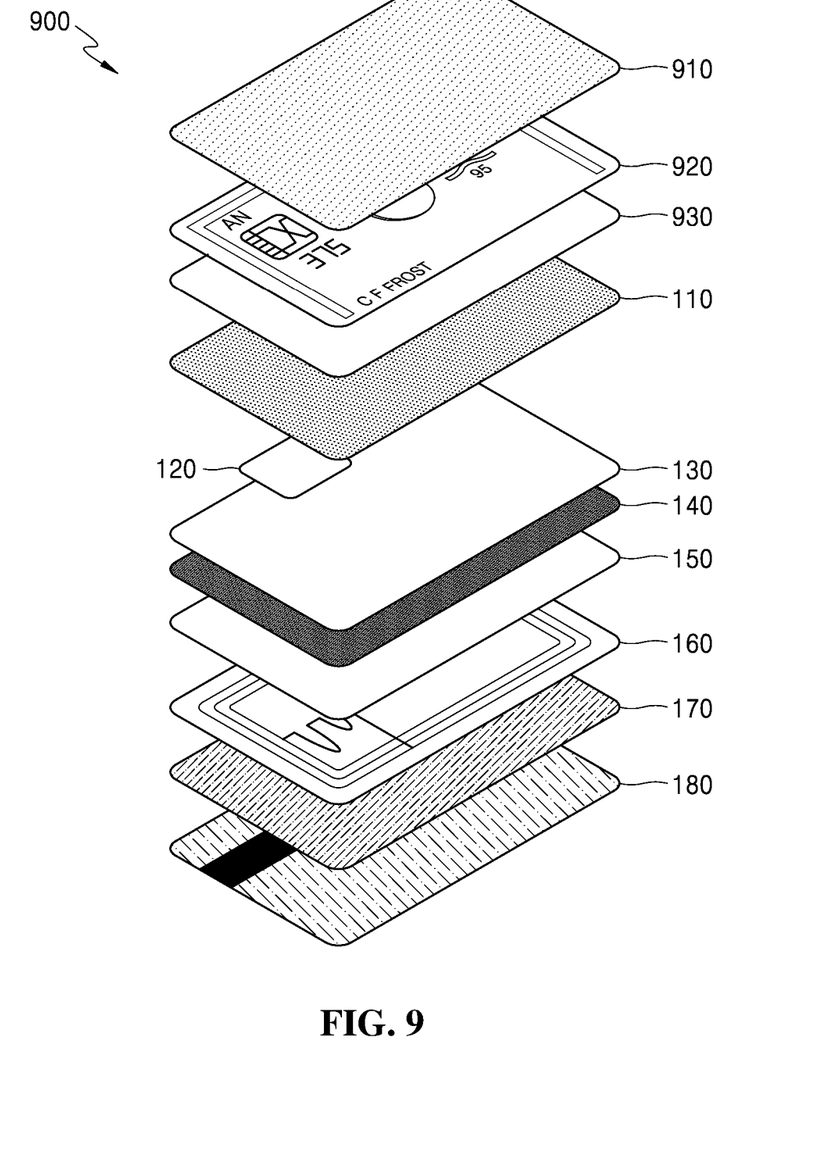
FIG. 9 is a perspective view showing a layer structure of the metal card after post processes inclusive of top printing and coating have been carried out.

FIG. 9 is a perspective view showing a layer structure of the metal card after post processes inclusive of top printing and coating have been carried out.

As shown in FIG. 9, the metal card 500 has a coated layer 910, a three dimensional printed layer 920, and a primer layer 930, in addition to the layers as shown in FIG. 1.

A primer is applied to the individual metal card 100 to form the primer layer 930. The primer layer 930 includes a material for improving the preservation force of the printed information according to the material of the metal layer 110. Next, card information, pattern, and picture image are formed engravedly on the metal layer 110 onto which the primer is applied through the 3-D printing process to form the three dimensional printed layer 920. After that, the coated layer 910 is formed to protect the topmost surface of the metal card 100, so that the information formed through the 3-D printing process is not worn or removed.

According to an embodiment of the present invention, a C-cut process for roundedly grinding the corners of the card and a stamping process for attaching a signature panel and a hologram to the underside surface of the card may be carried out additionally in the individual metal card process.

As mentioned above, the second milling process in which the COB pad is inserted is carried out before the primer application process and the printing process, and so as to prevent the COB pad from being contaminated by the primer or coating material, otherwise, the second milling process may be carried out before the insertion of the COB pad after the coated layer has been formed.

The foregoing description of the embodiments of the invention has been presented for the purpose of illustration; it is not intended to be exhaustive or to limit the invention to the precise forms disclosed. It is therefore intended that the scope of the invention be limited not by this detailed description, but rather by the claims appended hereto. The terminology used herein is for the purpose of describing particular embodiments only and is not intended to be limiting. Identification symbols on steps are used for the convenience of the description, and they do not mean the order of the steps. The steps in the present invention may be differently carried out from the described order unless a specific order is described. That is, the steps may be carried out in the order parallel with each other, selectively, or individually. The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

The invention claimed is:

1. A metal card manufacturing method comprising:
preparing a metal sheet having a given size capable of accommodating a plurality of individual cards;
forming holes on at least one or more edges of stacked sheets formed by stacking a plurality of sheets, the plurality of sheets comprising one or more adhesive sheets and an inlay sheet on which antenna coils are printed, wherein each of the plurality of sheets have a same size capable of accommodating the plurality of individual cards;
fitting the holes formed on the stacked sheets to pins located on a loading plate;
placing the metal sheet on top of the stacked sheets;
forming a metal card sheet through lamination among the metal sheet and the stacked sheets; and
cutting the metal card sheet along individual card outlines of the plurality of individual cards,
wherein the cutting the metal card sheet comprises injecting cooling alcohol while cutting the individual card outlines by means of a cutting tool using a computer numerical control (CNC) machining process.

2. The metal card manufacturing method according to claim 1, wherein the forming holes on at least one or more edges of the stacked sheets comprises punching the holes on positions adjacent to corners at which the two or more edges of the stacked sheets meet.

3. The metal card manufacturing method according to claim 2, further comprising exchanging the cutting tool with new one when cutting operations for the individual card outlines are performed over a predetermined number of times set in advance.

4. The metal card manufacturing method according to claim 2, wherein the preparing the metal sheet comprises:
forming holes on at least one or more edges of the metal sheet; and
forming insertion spaces on an underside of the metal sheet coming into contact with the stacked sheets through the CNC machining process.

5. The metal card manufacturing method according to claim 4, wherein the preparing the metal sheet further comprises inserting machined layers made of a plastic material into the insertion spaces.

6. The metal card manufacturing method according to claim 5, wherein the preparing the metal sheet further comprises forming machined layer exposure portions on an opposite side surface to the underside of the metal sheet on which the machined layers are inserted.

7. The metal card manufacturing method according to claim 6, wherein the cutting the metal card sheet further comprises cutting chip exposure areas having a smaller width than the machined layer exposure portions and located inside each individual card outline to allow the antenna coils of the inlay sheet to be exposed to an outside.

* * * * *